J. J. WHITE.
SAFETY CATCH FOR JEWELRY.
APPLICATION FILED JULY 27, 1920.

1,362,656.

Patented Dec. 21, 1920.

Inventor
Joseph J. White,

By H L Woodward
Attorney

UNITED STATES PATENT OFFICE.

JOSEPH J. WHITE, OF PROVIDENCE, RHODE ISLAND, ASSIGNOR TO J. J. WHITE MANUFACTURING COMPANY.

SAFETY-CATCH FOR JEWELRY.

1,362,656. Specification of Letters Patent. Patented Dec. 21, 1920.

Application filed July 27, 1920. Serial No. 399,287.

*To all whom it may concern:*

Be it known that I, JOSEPH J. WHITE, a citizen of the United States, residing at Providence, in the county of Providence and State of Rhode Island, have invented certain new and useful Improvements in Safety-Catches for Jewelry, of which the following is a specification.

The invention has for an object to effect an improvement in fasteners used in securing the ends of bracelets, necklaces or other jewelry parts together, and it is of particular value upon bracelet fastenings. It is an important aim to give a safety catch which utilizes structure and operation already familiar in the art, in the main, involving only the application of an additional member which will coöperate with the familiar fastening in a novel and efficient way to assure the security of the fastening.

Additional objects, advantages and features of invention will be readily understood from the following description and from the drawings, involving constructions, arrangement and combination of parts therein presented.

Figure 1:
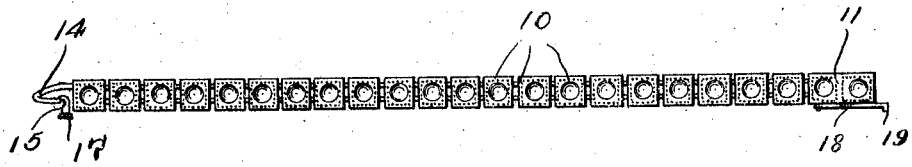
Figure 1 is a plan view of a bracelet having my invention incorporated thereon, the bracelet being open.
Figure 2:
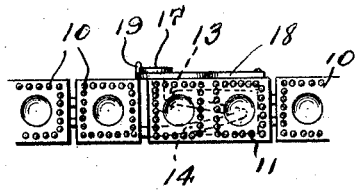
Fig. 2 is an enlarged view of the fastening link and safety catch.
Figure 3:
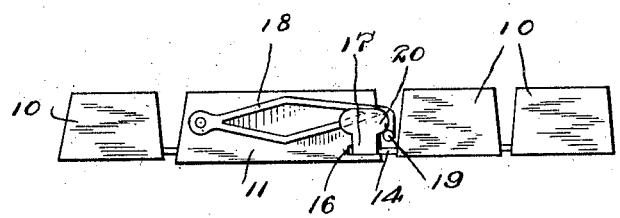
Fig. 3 is a fragmentary side elevation of the fastening and catch.

There is illustrated a bracelet which may be of any usual design, including in the present instance, a plurality of linked blocks 10 and a terminal fastener block 11, having in its outer end an opening extending in the block formed with a shoulder or lug 13 projected inwardly from one side. At the opposite end of the bracelet from the link 11 there is mounted on the terminal link 10, a latch spring 14, V-shaped in form, having one arm secured to the link 10 of the bracelet, and the other free to be compressed between the lug 13 and the opposite side of the opening in the block 11 when the spring is inserted therein. Adjacent its free end the spring is formed with a notch 15 to receive the shoulder lug 13 whereby the spring is held against withdrawal, until the free end is compressed to disengage the lug 13. The free end of the spring is extended laterally, the link 11 being provided with a lateral slot 16 in its end to receive this lateral portion, and a finger piece 17 is formed on the outer end of the extension turned upwardly at right angles to the extension so as to lie parallel to the side of the block 11 when the parts are in coengagement, but spaced slightly outward from the block leaving a sufficient space between the block and the finger-piece to receive a safety catch 18 in the space thus provided. The catch 18 is in the form of a lever pivoted upon that side of the block 11 adjacent the finger-piece 17, but at the opposite end of the link from the finger-piece, and arranged so that it may be set between the finger-piece and the block at times, and raised therefrom when desired. The lever is provided with a lateral short arm 19 at its outer end, adapted to be manipulated by the finger nail of an operator for movement into or out of engagement with the finger-piece 17. This arm 19 lies close beside the lateral extension of the latch spring and the finger-piece 17 is formed with a knob portion 20 at its upper part which extends longitudinally of the block 11 slightly over the arm 19 when the parts are in engaged position. This knob piece is rounded at the under part and the upper part so that the arm 19 may be forced upwardly or downwardly past the knob portion causing flexure of the part, the parts being resilient and yielding to the wiping action occurring under such movement.

It has been the experience that in latches of this character, heretofore, the spring member is sometimes compressed when the wearers' arm strikes or bears against an object, or when garments become engaged upon the spring end, with the result that the fastening is disconnected and the jewelry lost.

With my invention, when the safety catch lever 18 is placed in engaged position, the finger-piece of the latch spring cannot be pressed inwardly, until the lever is moved outwardly. The parts are so designed and correlated that casual movement of the latch lever from operative engagement is a minimum liability, owing to the fact that it lies next to the arm of the wearer so that objects cannot strike it from that direction which is necessary to its operation, and for the further reason that it lies closely under the knob portion of the latch, where it cannot be easily engaged casually.

What is claimed:

1. In a fastening for jewelry, a resiliently supported compressible member movable for positioning of parts in disengaging relation, a safety catch member movable into the path of the compressible member and having a projection to lie adjacent the person of the wearer from said compressible member, said compressible member having a yielding portion extended thereover for wiping coengagement.

2. In a fastening for jewelry, a body member, a separable fastening element cooperative therewith including a compressible releasing member therebeside, a safety lever mounting on said body movable into position between the body and said compressible member to block compressive movement thereof, said safety member and compressible member having parts constructed for wiping coengagement, the wiping portion on the safety member being constructed to lie next the person of the wearer.

In testimony whereof I have affixed my signature in presence of two witnesses.

JOSEPH J. WHITE.

Witnesses:
 FRED. B. WHITE,
 ROBERT L. WARD.